Feb. 23, 1932.  R. BECK  1,846,705
GAUGE
Filed Oct. 7, 1927
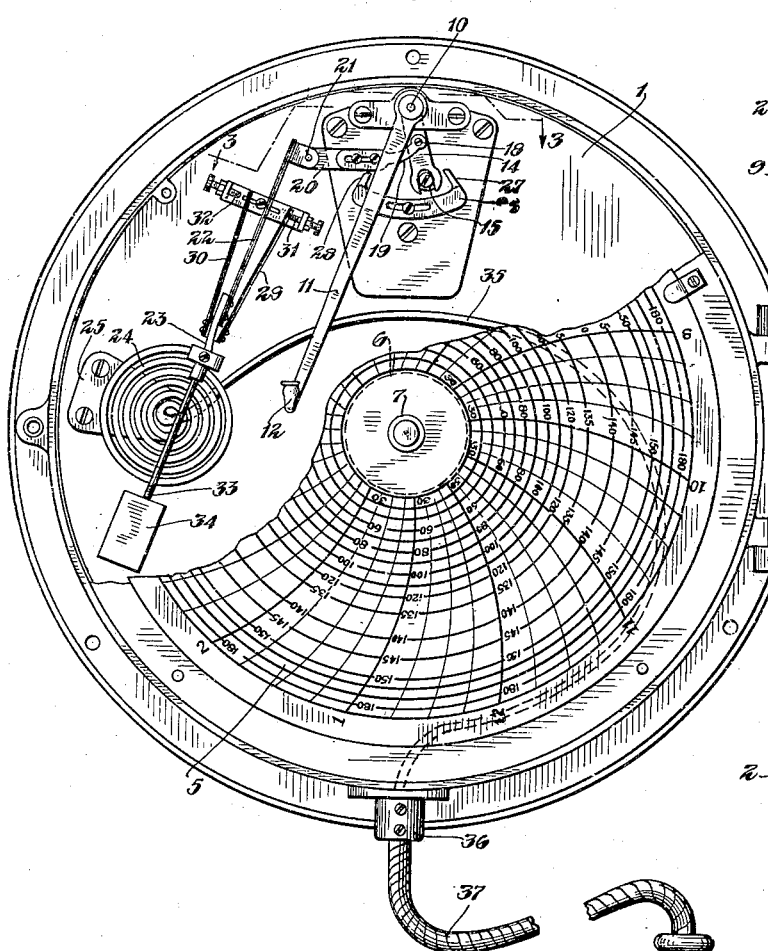
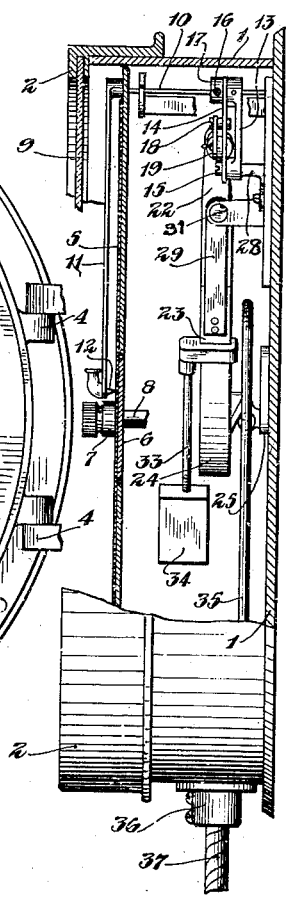
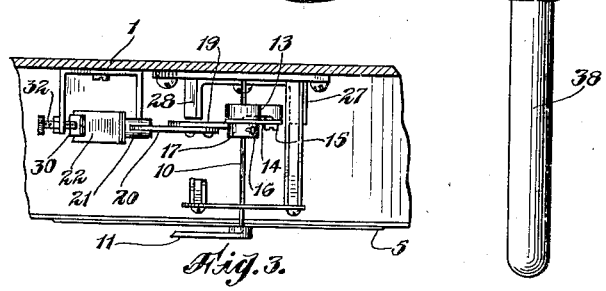
Inventor
Rudolf Beck
By his Attorneys
Ward, Crosby & Smith Patented Feb. 23, 1932

1,846,705

UNITED STATES PATENT OFFICE

RUDOLF BECK, OF BROOKLYN, NEW YORK, ASSIGNOR, BY MESNE ASSIGNMENTS, TO CONSOLIDATED ASHCROFT HANCOCK COMPANY, INC., OF NEW YORK, N. Y., A CORPORATION OF DELAWARE

GAUGE

Application filed October 7, 1927. Serial No. 224,644.

My invention relates to improvements in gauges and while in the preferred form illustrated it is particularly applicable to the recording or indicating of temperatures, the invention in its broader aspects, is applicable to other types of gauges for indicating pressures, etc. The main object of the invention is to provide an improved gauge whereby certain indications are represented on a larger scale than others. Further and more specific objects, features and advantages will more clearly appear from the detail description given below taken in connection with the accompanying sheet of drawings forming a part of this specification.

In the drawings, Fig. 1 is a front view of a gauge embodying my improvements in a a preferred form, certain parts being broken away in order to more clearly illustrate the same; Fig. 2 is a side view, certain parts being broken away to more clearly illustrate the same, and Fig. 3 is a section taken substantially on the line 3—3 of Fig. 1.

Referring to the drawings 1 represents a suitable casing provided with a front cover 2 hinged to the casing 1 at 4. Arranged in the front part of the casing is a record chart 5 secured upon the rotatable table 6 by thumb clamp 7. The table 6 is carried on a spindle or shaft 8 which is constantly rotated by suitable clock mechanism not shown, so that the record chart is constantly rotated thereby. The cover 2 is provided with a glass window 9 through which the chart is clearly visible.

10 represents a spindle suitably journalled in the framework and rigidly secured to the spindle 10 is a movable arm 11 carrying an ink marking device 12 at its free end. Thus the arm or pointer 11 is pivoted to swing or move over the record chart to make a permanent record of its movements thereon. Also rigidly secured to the spindle 10 is an arm 13, and mounted to swing about the spindle 10 is a plate 14 having a forked outer end engaged by a pintle 15 having an eccentric head seated within the forked end whereby by turning the latter the arm 14 may be given slight angular adjustment with respect to the arm 13. Pivotally connected with the arm 14 at 18 is one end of a two part link 19, 20, the two parts of which are adjustably secured together whereby the length of the link may be adjusted as desired. The other end of the link is pivotally connected at 21 with the upper or free end of an arm 22, the other end of which is rigidly connected to a head piece 23 which in turn is rigidly connected to the free end of a hollow coiled spring or Bourdon spring 24. The other or inner end of the hollow spring 24 is rigidly connected to a base 25 secured to the inside of the casing.

26 represents a member adjustably secured to the inside of the casing and provided with projecting arms 27 and 28 at each end respectively, which arms serve as stops for arms 13, 14. 29 and 30 represent leaf spring members secured on opposite sides of the head 23. The outer or free ends of the springs 29 and 30 are adapted to engage adjustable screw stops 31 and 32 respectively. The springs 29 and 30 as well as the arm 22 are each composed of two plates of different metals secured flat against one another, whereby they will automatically bend with variations in temperature, that is, they are thermostatic strips which respond to changes in temperature in a manner well understood by those skilled in the art. Rigidly secured to the head 23 is a downwardly extending arm 33 carrying a counterweight 34 adapted to counterbalance the other parts carried by the head 23. Connected with the inner end of the hollow spring 24 is a tubular connection 35 which is connected by means of a nipple 36 with another tube 37, the outer end of which is connected with a suitable thermometric bulb 38.

In operation, the bulb 38, tubes 37, 35 and hollow spring 24 are filled with a suitable fluid such as mercury adapted to expand with increasing temperature. The volume of the spring 24 and tubes 35 and 37 is relatively small as compared with the volume of the bulb 38. The bulb 38 is placed at the point, the temperature of which is desired to measure. As the temperature rises the pressure in the spring 24 increases thereby causing the spring to expand and the arm 22 to swing to left as viewed in Fig. 1. This causes the arm 11 to swing over the chart in accordance with the increase in temperature indicating and recording the various bulb temperatures thereon.

Assuming the temperature being recorded is between 135° and 150°, the arm 22 and the springs 29 and 30 will be in such position that both of the springs will be away from their respective stops 31 and 32. If now the temperature drop below 135°, the spring 29 will engage the stop 31 and thus the movement of the indicating arm 11 will be retarded for temperatures below 135°. Hence it will be noted that the readings between 135° and 150° are on a much larger scale than they are below 135°. Likewise should the temperature being recorded exceed 150° the spring 30 will engage its stop 32 and so retard the movement of the arm 11 for all temperatures above 150° and the readings on the chart above 150° are on a much smaller scale than they are between 135° and 150°. The arrangement described will be found particularly useful in recording temperatures in the pasteurization of milk, the pasteurizing temperature being between 135° and 150°. Thus the temperatures between these values are on a larger scale so that the pasteurization may be more accurately regulated and recorded. It will be understood, however, that for other purposes the large scale readings may be different portions of the scale.

Changes in room temperature, i. e., changes in temperature along the tubes 35, 37 and at the spring 24 are likely to cause errors unless compensated for. Changes in such temperature will cause slight changes in the pressure of the mercury or other fluid in the spring 24 even though the temperature at the bulb 38 remain constant. To compensate for such changes in room temperature, the arm 22 and leaf springs 29 and 30 are made of thermostatic strips. An increase in such room temperature will tend to cause the arm 11 to move a slight distance to the left as viewed in Fig. 1. However, this increase in room temperature, acting on the thermostatic strip 22 will cause it to bend in a direction tending to swing the arm to the right as viewed in Fig. 1 thus substantially compensating for the change in room temperature. The same changes in room temperature cause the thermostatic spring strips 29 and 30 to bend so that they will still engage their respective stops 31 and 32 at the bulb temperatures of 135° and 150° respectively. If the apparatus were not so compensated, changes in room temperature, by changing slightly the expansion of the spring 24, would change the points at which the springs 29 and 30 engage their stops with respect to the readings on the chart, thus bringing in slight errors.

While I have described my improvements in detail and with respect to a preferred embodiment thereof, I do not desire to be limited to such embodiment or details since many changes and modifications may be made and the invention, in its broader aspects, embodied in widely different forms and for many different purposes. Hence I desire to cover all modifications and forms coming within the language or scope of any one or more of the appended claims.

What I claim as new and desire to secure by Letters Patent, is:

1. A temperature gauge having indicating mechanism, a hollow spring adapted to expand with increase in pressure therein, means whereby expansion of the spring operates said indicating mechanism, a bulb, a fluid in said bulb, a fluid connection between the bulb and hollow spring whereby variations in temperature at the bulb will vary the pressure of the fluid in the bulb and hollow spring, means whereby the indicating mechanism is retarded until the temperature indicated reaches a predetermined point, the indicating mechanism acting without retardation as the temperature indicated rises above said predetermined point whereby the higher temperatures will be indicated on a larger scale, and means for compensating for changes in temperature along said fluid connection both when the temperatures indicated are below said predetermined point and when they are above it.

2. A temperature gauge having indicating mechanism, a hollow spring adapted to expand with increase in pressure therein, means whereby expansion of the spring operates said indicating mechanism, a bulb, a fluid in said bulb, a fluid connection between the bulb and hollow spring whereby variations in temperature at the bulb will vary the pressure of the fluid in the bulb and hollow spring, and means whereby the indicating mechanism is retarded until the temperature indicated reaches a predetermined point, the indicating mechanism acting without retardation as the temperature indicated rises above said predetermined point whereby the higher temperatures will be indicated on a larger scale, until a higher predetermined temperature has been reached, means whereby the indicating mechanism is again retarded as the temperature indicated further rises whereby for the last mentioned temperatures the indications are again on a smaller scale, and means for compensating for changes in temperature along said fluid connection during all three of said sets of temperature indications.

3. A temperature gauge having indicating mechanism, a hollow spring adapted to expand with increase in pressure therein, means whereby expansion of the spring operates said indicating mechanism, a bulb, a fluid in said bulb, a fluid connection between the bulb and hollow spring whereby variations in temperature at the bulb will vary the pressure of the fluid in the bulb and hollow spring, and means whereby the indicating mechanism is retarded until the temperature indicated reaches a predetermined point, the indicating mechanism acting without retardation as the temperature indicated rises above said predetermined point whereby the higher temperatures will be indicated on a larger scale, until a higher predetermined temperature has been reached, means whereby the indicating mechanism is again retarded as the temperature indicated further rises whereby for the last mentioned temperatures the indications are again on a smaller scale, and means for compensating for changes in temperature along said fluid connection during all three of said sets of temperature indications, said indicating mechanism including a constantly rotating record chart and a movable member adapted to make a time record of said temperatures thereon.

4. A gauge having in combination indicating mechanism, a hollow spring adapted to expand or contract with changes in pressure therein, means connecting said spring to operate the indicating mechanism, and a spring acting to retard the indicating mechanism during a part only of its range, said last mentioned spring being thermostatically controlled to compensate for certain changes in temperature.

5. A gauge having in combination indicating mechanism, a hollow spring adapted to expand or contract with changes in pressure therein, means connecting said spring to operate the indicating mechanism, a spring acting to retard said indicating mechanism during one set of indications; and a spring acting to retard said indicating mechanism during another set of indications, leaving the indicating mechanism unretarded during an intermediate set of indications, said last two mentioned springs being thermostatically controlled to compensate for certain changes in temperature.

6. A temperature gauge having indicating mechanism, a hollow spring adapted to expand with increase in pressure therein, means whereby expansion of the spring operates said indicating mechanism, a bulb, a fluid in said bulb, a fluid connection between the bulb and hollow spring whereby variations in temperature at the bulb will vary the pressure of the fluid in the bulb and hollow spring, and means whereby the indicating mechanism is retarded until the temperature indicated reaches a predetermined point, the indicating mechanism acting without retardation as the temperature indicated rises above said predetermined point whereby the higher temperatures will be indicated on a larger scale, and means for compensating for changes in temperature along said fluid connection both when the temperatures indicated are below said predetermined point and when they are above it.

7. A temperature gauge having indicating mechanism, a hollow spring adapted to expand with increase in pressure therein, means whereby expansion of the spring operates said indicating mechanism, a bulb, a fluid in said bulb, a fluid connection between the bulb and hollow spring whereby variations in temperature at the bulb will vary the pressure of the fluid in the bulb and hollow spring, means whereby the indicating mechanism is retarded until the temperature indicated reaches a predetermined point, the indicating mechanism acting without retardation as the temperature indicated rises above said predetermined point whereby the higher temperatures will be indicated on a larger scale, until a higher predetermined temperature has been reached, means whereby the indicating mechanism is again retarded as the temperature indicated further rises whereby for the last mentioned temperatures the indications are again on a smaller scale, and means for compensating for changes in temperature along said fluid connection during all three of said sets of temperature indications.

8. The combination with a deflecting member having a predetermined range of movement, of means for moving said member in accordance with changes in magnitude of a condition, and means for opposing movement of said deflecting member throughout a part of said range, said deflecting member moving in accordance with compensations effected for changes in ambient temperature.

9. The combination with a deflecting member having a predetermined range of movement, of an operating device movable in accordance with changes in magnitude of a condition, means forming a mechanical connection between said member and device, said first named means comprising a bimetallic strip, and means for opposing movement of said member throughout a part only of said range.

10. The combination with a deflecting member having a predetermined range of movement, of an operating device movable in accordance with changes in magnitude of a condition, means forming a mechanical connection between said member and device, said first named means comprising a bimetallic strip, and means for opposing movement of said member when moving in either direction from a predetermined section of said range.

11. The combination with a deflecting member having a predetermined range of movement, of an operating device movable in accordance with changes in magnitude of a condition, means forming a mechanical connection between said member and device, said first named means comprising a bimetallic strip, and means comprising springs coactable, respectively, with opposite sides of said first named means for opposing movement of said member when moving in either direction from a predetermined section of said range.

12. The combination with a deflecting member having a predetermined range of movement, of an operating device movable in accordance with changes in magnitude of a condition, means forming a mechanical connection between said member and device, said first named means comprising a bimetallic strip, and means comprising bimetallic springs coactable, respectively, with opposite sides of said first named means for opposing movement of said member when moving in either direction from a predetermined section of said range.

13. The combination with a deflecting member having a predetermined range of movement, of a hollow spring changeable in configuration in accordance with changes in pressure therein, said deflecting member being connected to said hollow spring, means for opposing movement of said deflecting member when moving in one direction beyond a predetermined section of said range, and means for opposing movement of said deflecting member when moving in reverse direction beyond said predetermined range section, said first and second named means being ineffective while said deflecting member is within said predetermined range section, movement of said deflecting member within said predetermined range section being compensated for changes in ambient temperature.

14. The combination with a deflecting member having a predetermined range of movement, of a hollow spring changeable in configuration in accordance with changes in pressure therein, said deflecting member being connected to said hollow spring, means for opposing movement of said deflecting member when moving in one direction beyond a predetermined section of said range, and means for opposing movement of said deflecting member when moving in reverse direction beyond said predetermined range section, said first and second named means being ineffective while said deflecting member is within said predetermined range section, movement of said deflecting member throughout said predetermined range of movement being compensated for changes in ambient temperature.

In testimony whereof I have signed my name to this specification.

RUDOLF BECK.